United States Patent
Burkhart et al.

[11] Patent Number: 5,985,948
[45] Date of Patent: Nov. 16, 1999

[54] USE OF SILICONE POLYETHER COPOLYMERS IN THE PRODUCTION OF HIGH-RESILIENCE POLYURETHANE FOAMS

[75] Inventors: Georg Burkhart; Bernd-Jürgen Klietsch; Rolf-Dieter Langenhagen; Andreas Weier, all of Essen, Germany

[73] Assignee: Th. Goldschmidt Ag, Essen, Germany

[21] Appl. No.: 09/257,699

[22] Filed: Feb. 25, 1999

[30] Foreign Application Priority Data

Feb. 28, 1998 [DE] Germany ............... 198 08 581

[51] Int. Cl.$^6$ ................................. C08G 18/48
[52] U.S. Cl. ........................................... 521/112
[58] Field of Search ............................. 521/112

[56] References Cited

U.S. PATENT DOCUMENTS

| | | |
|---|---|---|
| 4,119,582 | 10/1978 | Matsubara et al. . |
| 4,477,601 | 10/1984 | Battice . |
| 5,306,737 | 4/1994 | Burkhart et al. . |
| 5,357,018 | 10/1994 | Burkhart et al. . |

FOREIGN PATENT DOCUMENTS

| | | |
|---|---|---|
| 0 041 216 A2 | 12/1981 | European Pat. Off. . |
| 0 043 110 A1 | 1/1982 | European Pat. Off. . |
| 3626297 C1 | 7/1987 | Germany . |
| 907971 | 10/1962 | United Kingdom . |

*Primary Examiner*—Morton Foelak
*Attorney, Agent, or Firm*—Frommer Lawrence & Haug LLP

[57] ABSTRACT

The invention relates to the use of silicone-polyether copolymers of the formula I

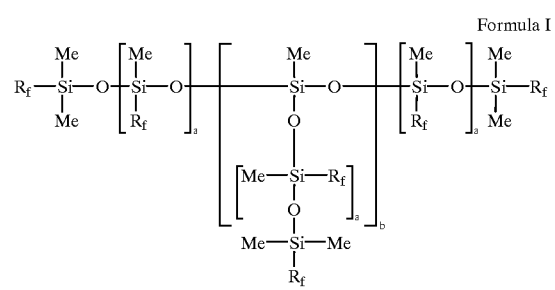

as surface-active substances in the production of high-resilience polyurethane foams.

9 Claims, No Drawings

USE OF SILICONE POLYETHER COPOLYMERS IN THE PRODUCTION OF HIGH-RESILIENCE POLYURETHANE FOAMS

BACKGROUND OF THE INVENTION

1. Field of the Invention

The present invention relates to the use of certain silicone-polyether copolymers as surface-active substance in the production of high resilience (HR) polyurethane foams.

2. Description of the Related Art

According to the prior art, the processes employed in the production of polyurethane foams are differentiated into a number of types. This differentiation may be in respect of both the types of chemicals used and the production machines used. Thus, for example, a distinction is made between batchwise manufacture in boxes or molds and continuous manufacture on various types of foaming machine. Significantly different groups of polyurethane foams art, also differentiated in terms of the raw materials used and thus the types of foam produced.

Thus, for example, rigid foams are, in terms of their property profile and use alone, significantly different from flexible foams, but even within the group of flexible foams a distinction is made between hot-cure foams and high resilience foams. Here, an HR foam is a highly elastic polyurethane foam formed by reaction of at least one bifunctional polyisocyanrate, e.g. tolylene diisocyanate or diphenylmethane diisocyanate, with at least one polyol which has at least two hydroxyl groups per molecule and has, on average, a high proportion of primary hydroxyl groups. Owing to the high content of primary OH groups, the polyols have a high reactivity toward the isocyanates.

In contrast to conventional polyurethane foams, namely hot-cure foams, a high crosslinking density is therefore achieved even during foaming. This has the advantages that input of relatively large amounts of energy during curing is usually unnecessary and that the total time for curing of the foams is reduced. A disadvantage is, however, that the tendency to form closed-celled foams is increased and therefore the processing latitude is also narrowed. Processing latitude refers to the tolerance limits within which it is possible to deviate from a formulation without a danger of forming stable and at the same time sufficiently open-celled foams or foams which can easily be opened by crushing. According to the prior art, this higher reactivity of the foaming components and the resulting narrower (in comparison to hot-cure flexible foam) processing latitude calls for special stabilizers. It does not allow use of products whose structure or molecular weight corresponds to the foam stabilizers which are successfully used in the production of hot-cure foams as foam stabilizers for HR foam production.

This prior art is reflected in a number of different patents in the polyurethane field. For example, as early as 1960, GB-A-907 971 stated that high molecular weight silicone oils cause an excessively large number of closed cells in the foam. For this reason, low molecular weight polydialkylsiloxanes having viscosities of from 2 to 9 centistokes at 25° C. are proposed in the cited patent. These then guarantee, compared to the prior art, an improved processing latitude (see column 2, lines 55 ff.). In the field of HR polyurethane foams, many low molecular weight polydimethylsiloxanes or short polydimethylsiloxanes modified by low-polarity groups have generally been proposed and are also used according to today's state of the art.

DE-A-36 26 297 describes siloxanes containing chloropropyl radicals as HR foam stabilizers. In this case too, the compounds described are relatively low molecular weight siloxanes which are substituted by groups of relatively low polarity. EP-A-0 041 216 also uses siloxanes which all have a short chain length and are additionally substituted by low-polarity and low molecular weight substituents, in this case alkoxy groups having from 1 to 7 carbon atoms. Even in those cases in which conventional silicone polyethers of relatively high molecular weight have hitherto been used in HR foam, e.g. in EP-A-0 043 110, these substances have essentially been used as minor amounts in admixture with typical HR foam stabilizers. For example, in EP-A-0 043 110, the predominant part, at least 65%, of the stabilizer preparation used consists of typical HR foam structures with very short siloxanes with chain lengths of $\leq 10$ substituted with cyanoalkyl groups or end-capped polyethylene oxide units of low molecular weight.

U.S. Pat. No. 4,477,601 also unambiguously states that the major part of a cold-cure foam stabilizer typically comprises low molecular weight siloxanes having relatively small proportions of polar substituents. Thus, according to the cited patent, at least 78% of stabilizers having a typical HR foam stabilizer structure is necessary. According to the text, proportions greater than 22% of a stabilizer for conventional flexible urethane foams, in this text described as hot-cure flexible foams, result in, a very small processing latitude with a tendency to form closed-celled foams which sometimes shrink.

U.S. Pat. No. 4,119,582 describes a process for producing cold-cure foams using, a foam stabilizer comprising a mixture of a "high" molecular weight siloxane-oxyalkylene copolymer with a "low" molecular weight siloxane-oxyalkylene copolymer. While the "high" molecular weight siloxane-oxyalkylene copolymer has at least five oxyalkylene units in each oxyalkylene block and is present in the mixture in an amount of from 84 to 99.9% by weight, the "low" molecular weight siloxane-oxyalkylene copolymer has up to four oxyalkylene units in each oxyalkylene block and is present in the mixture in an amount of from 0.2 to 16% by weight. The "high" molecular weight siloxane-oxyalkylene copolymer has a molecular weight in the range from 1000 to 16,000, while the "low" molecular weight siloxane-oxyalkylene copolymer covers a molecular weight range from 500 to 10,000. Accordingly, the two classes of copolymer are not necessarily differentiated by their molecular weights but rather by the number of oxyalkylene units in their oxyalkylene blocks.

Nevertheless, even the "high" molecular weight siloxane-oxyalkylene copolymer is a small molecule compared to customary flexible block foam stabilizers. See, for example, U.S. Pat. No. 5,357,018 or U.S. Pat. No. 5,306,737).

OBJECT OF THE INVENTION

Surprisingly, it has been found that linkage of one or more polyethers of sometimes astonishingly high molecular weight with siloxanes also of significantly higher chain length than is normally customary for HR foam stabilizers of the prior art, can also give advantageous stabilizers or cell regulators for the production of HR foams.

SUMMARY OF THE INVENTION

The present invention accordingly provides for the use of silicone-polyether copolymers of the formula I

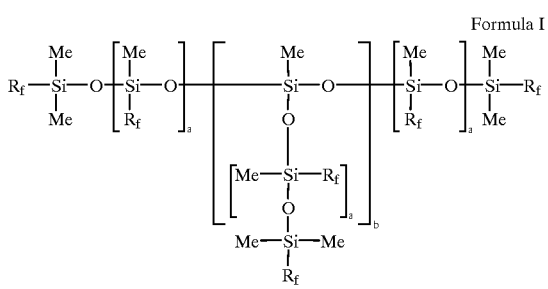

Formula I as surface-active substances in the production of HR polyurethane foams
where $R_f$ are either radicals $R^1$ or radicals $R^2$, where
$R^1$ are optionally halogen or psuedohalogen substituted alkyl radicals or substituted or unsubstituted aryl radicals, but at least about 30% of the radicals $R^1$ are methyl radicals, and
$R^2$ are identical or different polyether radicals of the average formula

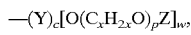

where
c=0 or 1,
x=2 to 4,
p≧1,
w=to 4,
  Z=a hydrogen atom or a monovalent organic radical,
  Y=a (w+1)-valent hydrocarbon radical which may also be branched,
where the ratio (number of $R^1$+number of $R^2$)/(number of $R^2$) is ≦20,
with the proviso that at least one radical $R^2$ has a mass of more than about 1200, preferably more than about 2000, and
  b is from 0 to 8,
  a is from 2 to 100 if b is from 6 to 8,
  a is from 3 to 100 if b is from 3 to 6 and
  a is from 9 to 200 if b is from 0 to 3,
with the further proviso that the average number of silicon atoms per molecule is greater than about 20, preferably greater than about 35, and the average molar mass of the silicone-polyether copolymers is more than about 16,000.

DESCRIPTION OF THE PREFERRED EMBODIMENTS

The siloxane framework can be linear (b=0) or branched (b>0 to 8). The value of a can, on the basis of experience, only be combined in the manner indicated with values of b, since otherwise the increased viscosity of the polymer molecules leads to gelling and makes handling impossible. The compounds of the invention are therefore pourable at room temperature. The values of both b and a are, as those skilled in the art will know, average values in the polymer molecule since the silicone-polyether copolymers to be used according to the invention are, as a rule, in the form of equilibrated mixtures.

The radicals $R^1$ are linear or branched, unsubstituted or halogen- or pseudohalogen-substituted alkyl radicals having, for example, from 1 to 6 carbon atoms, or aryl radicals. Especially preferred radicals include methyl, ethyl, propyl, chloropropyl, butyl radicals, or phenyl radicals. For reasons of price and ease of production, methyl radicals are preferred, so that at least 30% of the radicals $R^1$ should be methyl radicals. Particular preference is given to those silicone-polyether copolymers in which all radicals $R^1$ are methyl radicals.

Z is hydrogen or a monovalent organic radical, in particular the radical $C_1$–$C_4$-alkyl or CO—($C_1$–$C_6$-alkyl) or a urethane radical.

It is possible to use either one or more silicone-polyether copolymers in combination with one another; the products according to the invention are present in a proportion of more than about 35%, preferably more than about 50%, particularly preferably more than about 90%, of the silicone-containing substances of the total cold-cure foam stabilizer. As has long been known to persons familiar with this technical field, short-chain siloxanes or siloxane rings are always formed in small amounts by equilibration during the preparation of these siloxane chains due to thermodynamics. Here they are not taken into account separately. The stabilizers used according to the invention can be obtained by combining siloxanes having chain lengths of more than 20, preferably more than 35, with one or more polyethers, where at least one polytther, preferably all polyethers used, has or have a molecular weight of more than 1200, preferably more than 2000.

The polyethers can comprise ethylene oxide, propylene oxide and up to about 20% of butylene oxide or higher alkylene oxides and can have both hydroxyl groups and/or $C_1$–$C_6$-alkyl ether or ester groups as end groups. The compounds are prepared as described in the literature for silicone-polyether copolymers, e.g. by hydrosilylation of a polyether containing double bonds, if desired in admixture with other polyethers containing double bonds (see, for example, U.S. Pat. No. 5,357,018 or U.S. Pat. No. 5,306, 737).

Combinations of various groups $R^2$ in the same polysiloxane are particularly preferred.

When used for producing HR polyurethane foams in molds, these compounds according to the invention have the ability to stabilize the molded foams sufficiently and to regulate the cell structure even close to the surface. The foam cushions obtained can be crushed comparatively easily.

To test the substances used according to the invention, the compounds are, in the concentrations indicated, foamed in a known manner in customary formulations which are used, for example, for producing automobile seats or cushions for furniture.

EXAMPLES

The following formulations were employed for the use in the following tests:

|  | Formulation 1 | Formulation 2 | Formulation 3 |
|---|---|---|---|
| Polyol 1 | 100 parts | 50 parts | 100 parts |
| Polyol 2 |  | 50 parts |  |
| Water | 3.0 parts | 4.0 parts | 3.0 parts |
| Diethanolamine | 2.0 parts | 1.2 parts |  |
| Triethanolamine |  |  | 1.2 parts |
| Tegoamin 33[(1)] | 0.4 part | 0.4 part | 0.6 part |
| Tegoamin BDE[(2)] | 0.05 part | 0.05 part |  |
| Dimethyl-ethanolamine |  |  | 0.2 part |
| T 80[(3)] | 37.8 parts | 51.1 parts |  |
| Isocyanate |  |  | 46.2 parts |

-continued

| | Formulation 1 | Formulation 2 | Formulation 3 |
|---|---|---|---|
| mixture of 40% crude MDI and 60% T 80 | | | |
| Stabilizer | variable | variable | variable |

Polyol 1 commercial polyether polyol MW 4800, OHN = 36
Polyol 2 commercial copolymer polyol, contains 40% of styreneacrylonitrile copolymer, OHN = 17
(1)Tegoamin 33 commercial amine catalyst from Th. Goldschmidt AG
(2)Tegoamin BDE commercial amine catalyst from Th. Goldschmidt AG
(3)T 80 commercial tolylene diisocyanate Stabilizers used:

| | Chain length of the Si block | Number of substituents $R^2$ | Polyol 1 mol % | MW 1 | EO % by wt. | End group | Polyol 2 mol % | MW 2 | EO % by wt. | End group |
|---|---|---|---|---|---|---|---|---|---|---|
| Stabilizer A | 25 | 10 | 100 | 1500 | 10 | OH | | | | |
| Stabilizer B | 40 | 10 | 50 | 1400 | 50 | Me | 50 | 4000 | 50 | OH |
| Stabilizer C | 100 | 17 | 50 | 1400 | 50 | OH | 50 | 4000 | 50 | OH |
| Stabilizer D | 40 | 10 | 50 | 1400 | 50 | Me | 50 | 4000 | 50 | Me |
| Stabilizer E | 40 | 10 | 50 | 1500 | 10 | OH | 50 | 4000 | 50 | Me |
| Stabilizer F | 40 | 10 | 50 | 1500 | 10 | OH | 50 | 4000 | 50 | OH |
| Comparison 1 | 12 | 0 | 0 | | | | | | | |
| Comparison 2 | 6 | 2 | 100 | 500 | 20 | Bu | 0 | | | |
| Comparison 3 | 9 | 3 | 100 | 400 | 100 | Me | 0 | | | |

Experimental Procedure

The components mentioned in Formulation 1 with the exception of the T 80 but inclusive of the stabilizers to be tested were mixed for 1 minute at 1000 rpm in a 2 liter beaker using a blade stirrer. After adding the T 80, mixing was continued for a further 7 seconds at 2500 rpm. The reaction mixture was placed in a heated aluminum mold (40×40×10 cm) in the amount necessary for completely filling the mold with foam. After exactly 6 minutes, the foam was then removed from the mold and the force required for pressing it open was measured in the manner described.

The foams produced using the substances according to the invention were assessed according to the following criteria:

1) Cell structure: the typical HR foam has an irregular cell structure from which it obtains, inter alia, its good elastic properties. The irregular cell structure is therefore basically expected.

2) Surface zone regulation: the foam cushion should have a good cell structure throughout, from the core to the skin. A significantly coarse surface zone is regarded as a defect and is to be avoided.

The evaluation extends from good through slightly disrupted, greatly disrupted to ineffective.

3) Ability to be crushed: the ability of the cushion to be crushed is a measure of good demoldability. Foam cushions which can only be pressed open by application of a great deal of force tend to be torn and destroyed on removal from the mold.

To determine the force required to crush the foam open, the indentation load deflection at an indentation of 50% was measured on the freshly demolded foams, without them having been pressed first, by of Zwick machine. The cushion was subsequently pressed open completely by means of suitable measures. In the repeat measurement which then follows, the actual material hardness of the fresh foam was measured. The difference between the measured values for the first and second measurements was taken as the force required for crushing the foam open.

| | Formulation 1 | | | |
|---|---|---|---|---|
| | Concentration/ Parts | Cell structure | No. of cells/cm | Appearance of the surface zones | Force required for crushing (N) |
| Stabilizer A | 1.0 | irregular | 10 | good | 1600 |
| Stabilizer C | 0.1 | irregular | 9 | good | 1350 |
| Stabilizer D | 0.5 | irregular | 13 | good | 1638 |

-continued

| | Formulation 1 | | | |
|---|---|---|---|---|
| | Concentration/ Parts | Cell structure | No. of cells/cm | Appearance of the surface zones | Force required for crushing (N) |
| Stabilizer F | 0.5 | irregular | 11 | good | 1040 |
| Comparison 1 | 1.0 | irregular | 13 | good | 1666 |
| Comparison 2 | 0.1 | irregular | 12.5 | good | 1725 |
| Comparison 2 | 1.0 | irregular | 14 | good | >3000 |
| Comparison 3 | 0.1 | irregular | 9.5 | greatly disrupted | 1000 |
| Comparison 3 | 1.0 | irregular | 12 | good | 1841 |

As can been seen from the table giving the results for Formulation 1, a foam cushion having the irregular cell structure desired for an HR foam is obtained in all cases. The substances of the invention allow defect-free regulation right through to the sensitive surface zones. Surprisingly, the force required for crushing the foam may be regarded as extremely low for some of the stabilizers according to the invention (e.g. compared to the comparison substance 2 which is not according to the invention). High forces of >2500 N for crushing the foam open are associated with demolding problems in industrial production and are therefore undesirable.

Further foaming results in other formulations are described in the following tables.

Formulation 2

| | Concentration/ Parts | Cell structure | No. of cells/ cm | Appearance of the surface zones | Force required for crushing (N) |
|---|---|---|---|---|---|
| Stabilizer A | 1.0 | irregular | 12 | good | 1035 |
| Stabilizer C | 0.1 | irregular | 8.5 | good | 727 |
| Stabilizer E | 0.5 | irregular | 12 | good | 1535 |
| Stabilizer F | 0.1 | irregular | 11 | good | 364 |
| Comparison 1 | 1.0 | collapse | | | |
| Comparison 2 | 1.0 | irregular | 16 | good | >3000 |

In this formulation in particular, the substances according to the invention display an interesting balance between sufficient stabilization (see Comparison 1) and low force to crush values. Here, even small use concentrations are sometimes sufficient for good surface zone regulation.

Formulation 3

| | Concentration/ Parts | Cell Structure | No. of cells/ cm | Appearance of the surface zones | Force Required for crushing (N) |
|---|---|---|---|---|---|
| Stabilizer B | 1.0 | Irregular | 10 | good | 1580 |
| Stabilizer C | 0.1 | Irregular | 9.5 | good | 1145 |
| Stabilizer D | 1.0 | Irregular | 11 | good | 2134 |

Even when using MDI as isocyanate component in HR foam formulations, the products according to the invention can obviously be used with advantage.

The above description of the invention is intended to be illustrative and not liriting. Various changes or modifications in the embodiments described may occur to those skilled in the art. These can be made without departing from the scope and spirit of the invention.

We claim:

1. A method for the production of high resilience polyurethane foams, said method comprises adding to the components which ultimately produce the polyurethane foam, a silicone-polyether copolymer of the formula I

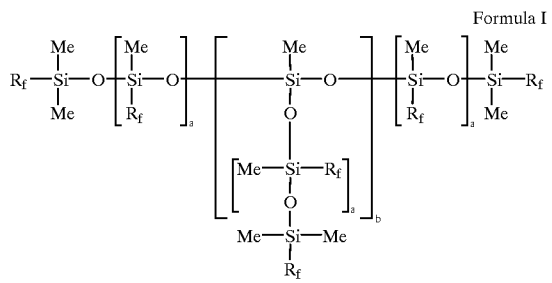

Formula I where
each $R_f$ is either a radical $R^1$ or a radical $R^2$, where
$R^1$ are optionally halogen or pseudohalogen substituted alkyl radicals atoms or substituted or unsubstituted aryl radicals, but at least about 30% of the radicals $R^1$ are methyl radicals, and
$R^2$ are identical or different polyether radicals of the average formula

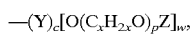

where
c=0 or 1,
x=2 to 4,
p≧1,
w=1 to 4,
Z=a hydrogen atom or a monovalent organic radical,
Y=a (w+1)-valent hydrocarbon radical which may also be branched,
where the ratio (number of $R^1$+number of $R^2$)/(number of $R^2$) is ≦20,
with the proviso that at least one radical $R^2$ has a mass of more than about 1200, and
b is from 0 to 8,
a is from 2 to 100 if b is from 6 to 8,
a is from 3 to 100 if b is from 3 to 6 and
a is from 9 to 200 if b is from 0 to 3,
with the further proviso that the average number of silicon atoms per molecule is greater than about 20, preferably greater than about 35, and the average molar mass of the silicone-polyether copolymers is more than about 16,000, as the surface-active substance and polymerizing and foaming said composition.

2. A method for the production of high resilience foams, said method comprises adding a silicone-polyether copolymers of the formula I

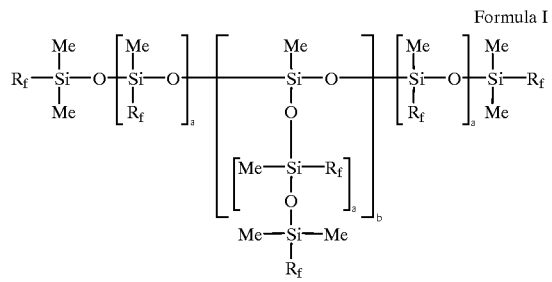

Formula I where
each $R_f$ is either a radical $R^1$ or a radical $R^2$, where
$R^1$ are alkyl radicals having from 1 to 6 carbon atoms or substituted or unsubstituted aryl radicals, but at least 30% of the radicals $R^1$ are methyl radicals, and
$R^2$ are identical or different polyether radicals of the average formula

where
c=0 or 1,
x=2 to 4,
p≧1,
w=1 to 4,
Z=a hydrogen atom or a monovalent organic radical,
Y=a (w+1)-valent hydrocarbon radical which may also be branched,
where the ratio (number of $R^1$+number of $R^2$)/(number of $R^2$) is ≦20,
with the proviso that at least one radical $R^2$ has a mass of more than 1200, preferably more than 2000, and
b is from 0 to 8,
a is from 2 to 100 if b is from 6 to 8,
a is from 3 to 100 if b is from 3 to 6 and
a is from 9 to 200 if b is from 0 to 3, with the further proviso that the average number of silicon atoms per moleculie is greater than 20, preferably greater than 35, and the average molar mass of the silicone-polyethter copolymers is more than 16,000, as surface-active substances.

3. The method according to claim 1, where at least one radical $R^2$ has a mass of more than about 2000.

4. The method according to claim 1, where
   $R^1$ is methyl, ethyl, propyl, chloropropyl, butyl or phenyl, and
   Z is hydrogen, $C_1$–$C_4$-alkyl, or CO—($C_1$–$C_6$)-alkyl.

5. The method according to claim 1, where Z is a urethane radical.

6. The method according to claim 1, wherein a cold-cure foam stabilizer is added and the silicone-polyether copolymer of formula I is present in a proportion of more than about 35% of the total amount of the cold-cure foam stabilizer.

7. The method according to claim 6, wherein the silicone-polyether copolymer of formula I is present in a proportion of more than about 50% of the total amount of the cold-cure foam stabilizer.

8. The method according to claim 6, wherein the silicone-polyether copolymer of formula I is present in a proportion of more than about 70% of the total amount of the cold-cure foam stabilizer.

9. In a method for the production of high resilience foams, the improvement which comprises adding a silicone-polyether copolymer of the formula I

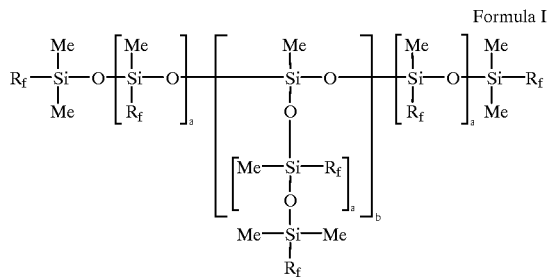

Formula I where
   each $R_f$ is either a radical $R^1$ or a radical $R^2$, where
      $R^1$ are optionally halogen or pseudohalogen substituted alkyl radicals atoms or substituted or unsubstituted aryl radicals, but at least about 30% of the radicals $R^1$ are methyl radicals, and
      $R^2$ are identical or different polyether radicals of the average formula

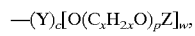

where
   c=0 or 1,
   x 2 to 4,
   p≧1,
   w=1 to 4,
      Z=a hydrogen atom or a monovalent organic radical,
      Y=a (w+1)-valent hydrocarbon radical which may also be branched,
   where the ratio (number of $R^1$+number of $R^2$)/(number of $R^2$) is ≦20, with the proviso that at least one radical $R^2$ has a mass of more than about 1200, and b is from 0 to 8,
a is from 2 to 100 if b is from 6 to 8,
a is from 3 to 100 if b is from 3 to 6 and
a is from 9 to 200 if bis from 0 to 3, with the further proviso that the average number of silicon atoms per molecule is greater than about 20, preferably greater than about 35, and the average molar mass of the silicone-polyether copolymers is more than about 16,000, as the surface-active substance.

* * * * *